(12) United States Patent
Ngiau (10) Patent No.: US 8,662,587 B2
(45) Date of Patent: Mar. 4, 2014

(54) LOWER TIP-SLIDE MECHANISM

(75) Inventor: Christopher Ngiau, Wolverine Lake, MI (US)

(73) Assignee: Magna Seating Inc., Aurora, Ontario (CA)

( * ) Notice: Subject to any disclaimer, the term of this patent is extended or adjusted under 35 U.S.C. 154(b) by 197 days.

(21) Appl. No.: 13/142,613

(22) PCT Filed: Jan. 22, 2010

(86) PCT No.: PCT/CA2010/000100
§ 371 (c)(1),
(2), (4) Date: Aug. 3, 2011

(87) PCT Pub. No.: WO2010/083607
PCT Pub. Date: Jul. 29, 2010

(65) Prior Publication Data
US 2011/0298265 A1    Dec. 8, 2011

Related U.S. Application Data

(60) Provisional application No. 61/205,652, filed on Jan. 22, 2009.

(51) Int. Cl.
*B60N 2/02* (2006.01)
(52) U.S. Cl.
USPC .. 297/341; 297/340; 297/344.21; 297/344.24
(58) Field of Classification Search
USPC ............. 297/341, 344.21, 378.1, 340, 344.24
See application file for complete search history.

(56) References Cited

U.S. PATENT DOCUMENTS

| | | | |
|---|---|---|---|
| 2,189,396 A | 2/1940 | Greig | |
| 2,428,217 A * | 9/1947 | Hedley et al. | 297/344.25 |
| 2,563,220 A * | 8/1951 | Doty | 297/344.26 |
| 2,618,312 A | 11/1952 | Bradley | |
| 3,973,799 A | 8/1976 | Berg | |
| 4,372,607 A | 2/1983 | Mizushima et al. | |
| 5,683,140 A * | 11/1997 | Roth et al. | 297/344.1 |
| 6,626,481 B2 | 9/2003 | Kawasaki | |
| 7,316,441 B2 * | 1/2008 | Iwatani et al. | 296/65.12 |
| 7,341,302 B2 | 3/2008 | Slade | |
| 2005/0116520 A1 * | 6/2005 | Wieclawski | 297/344.21 |
| 2008/0290706 A1 * | 11/2008 | Yamada et al. | 297/240 |

FOREIGN PATENT DOCUMENTS

| | | | |
|---|---|---|---|
| DE | 102007062581 A1 | 6/2009 | |
| EP | 1747935 A2 | 1/2007 | |
| EP | 1995110 A2 | 11/2008 | |
| GB | 647459 A | 12/1950 | |
| JP | 2004026014 A | 1/2004 | |
| WO | 2007131761 A1 | 11/2007 | |

* cited by examiner

*Primary Examiner* — Philip Gabler
(74) *Attorney, Agent, or Firm* — Miller Canfield (57) ABSTRACT

A seat assembly for an automotive vehicle is provided with a seat cushion and a seat back pivotally connected to the seat cushion for pivotal movement between an upright seating position and a forwardly folded dump position. A seat track assembly is fixedly secured to the seat cushion for providing a selective fore and aft sliding adjustment of the seat assembly along a first linear path between a full forward position and a full rearward position. A tip slide mechanism is operatively coupled to the seat track assembly and adapted for mounting the seat assembly to a vehicle floor. The tip slide mechanism provides fore and aft movement of the seat assembly along a second curved path transverse to the first linear path between a seating position and an easy entry position to provide access behind the seat assembly.

20 Claims, 7 Drawing Sheets

LOWER TIP-SLIDE MECHANISM

BACKGROUND OF THE INVENTION

1. Field of the Invention

The present invention relates to a vehicle seat assembly. More particularly, the present invention relates to a seat assembly for an automotive vehicle including a seat back pivotally coupled to a seat cushion and having a tip slide mechanism for positioning the seat assembly between a seating position and an easy entry position to facilitate ingress and egress behind the seat assembly.

2. Description of Related Art

Automotive vehicles include seat assemblies having a seat cushion and a seat back for supporting passengers above a vehicle floor. The seat assembly is commonly mounted to the vehicle floor by a pair of seat tracks for providing fore and aft adjustment of the seat assembly for passenger comfort. The seat back is also typically pivotally coupled to the seat cushion for pivotal movement between an upright position, a plurality of reclined positions, and a forward dump position overlying the seat cushion. The seat back may include a head restraint mounted to the top portion of the seat back for supporting the seat occupant's head.

It is also commonly known for the seat back to release the seat tracks in response to pivotal movement of the seat back to the forward dump position to allow forward sliding movement of the seat assembly along the seat tracks to a full forward position and providing ingress and egress behind the seat assembly. Various mechanisms have also been employed to provide further forward sliding movement of the seat assembly beyond the full forward position provided by the seat tracks in response to pivotal movement of the seat back often referred to as an easy entry position for providing ingress and egress behind the seat assembly, such as to a second row of seat assemblies. An example of such a mechanism is illustrated in U.S. Pat. No. 5,683,140.

However, the size, shape, and styling of the interior compartment of the vehicle may impact, impede, or limit the extent of movement of the seat assembly to the easy entry position. For example, the front instrument panel and center console of the vehicle may limit the forward sliding movement of the seat assembly.

Accordingly, it is desirable to provide seat assembly having a tip slide mechanism which provides for sliding and pivotal movement of the seat assembly along multiple paths in response to pivotal movement of the seat back in order to provide an easy entry position without impedance by the interior compartment of the vehicle.

SUMMARY OF THE INVENTION

According to one aspect of the invention, a seat assembly for an automotive vehicle includes a seat cushion and a seat back operatively coupled to the seat cushion for pivotal movement between an upright seating position and a forwardly folded dump position. A seat track assembly is operatively coupled to the seat cushion for providing selective fore and aft sliding adjustment of the seat assembly along a first path between a full forward position and a full rearward position. A tip slide mechanism is operatively coupled to the seat track assembly and adapted for mounting the seat assembly to a floor of the vehicle. The tip slide mechanism provides fore and aft movement of the seat assembly along a second path transverse to the first path between a seating position and an easy entry position to provide access behind the seat assembly.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENTS

Figures 1, 2, 3:
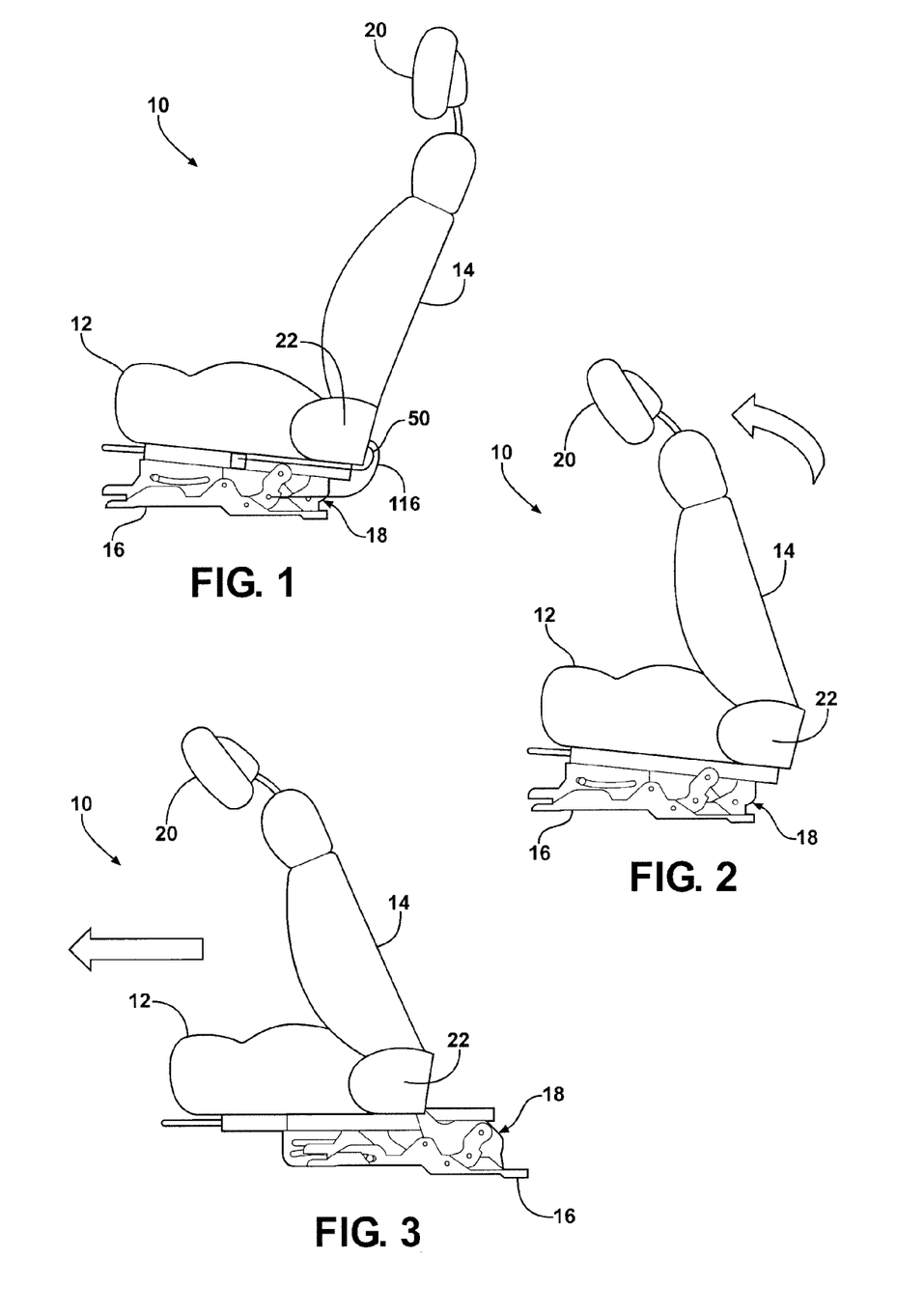
FIG. 1 is a side view of a seat assembly in a seating position with a seat back pivotally coupled to a seat cushion and in an upright position according to one embodiment of the invention.
FIG. 2 is a side view of the seat assembly with the seat back in a dump position.
FIG. 3 is a side view of the seat assembly in an easy entry position.

Referring to the Figures, wherein like numerals indicate like or corresponding parts throughout the several views, a seat assembly for use in an automotive vehicle is generally shown at 10. The seat assembly 10 includes a seat cushion 12 and a seat back 14 operatively coupled to the seat cushion 12 for pivotal movement between an upright position, a plurality of reclined positions, and a forward dump position at least partially overlying the seat cushion 12. In FIG. 1, the seat assembly 10 is shown in a seating position for supporting an occupant above a vehicle floor 16. The seat assembly 10 is mounted to the floor 16 by a riser assembly 18 which provides fore and aft movement of the seat assembly along the floor 16. In the seating position, the seat cushion 12 is disposed in a generally horizontal raised position spaced above the vehicle floor 16 by the riser assembly 18 and the seat back 14 is disposed in a generally vertical or upright seating position. In FIG. 2, the seat assembly 10 is shown with the seat back 14 pivoted forwardly to the dump position. And in FIG. 3, the seat assembly 10 is shown in an easy entry position wherein the seat back 14 is pivoted to the dump position and the seat cushion 12 is positioned fully forward along the floor 16 by the riser assembly 18. A head restraint 20 may be operatively mounted to the top portion of the seat back 14 for supporting a seat occupant's head as is commonly known in the art. Further, the seat back 14 is pivotally connected to the seat cushion 12 by a recliner mechanism 22 for providing selective locking and unlocking of the seat back 14 in the seating, reclined, and dump positions as is also commonly known in the art.

Figure 4:
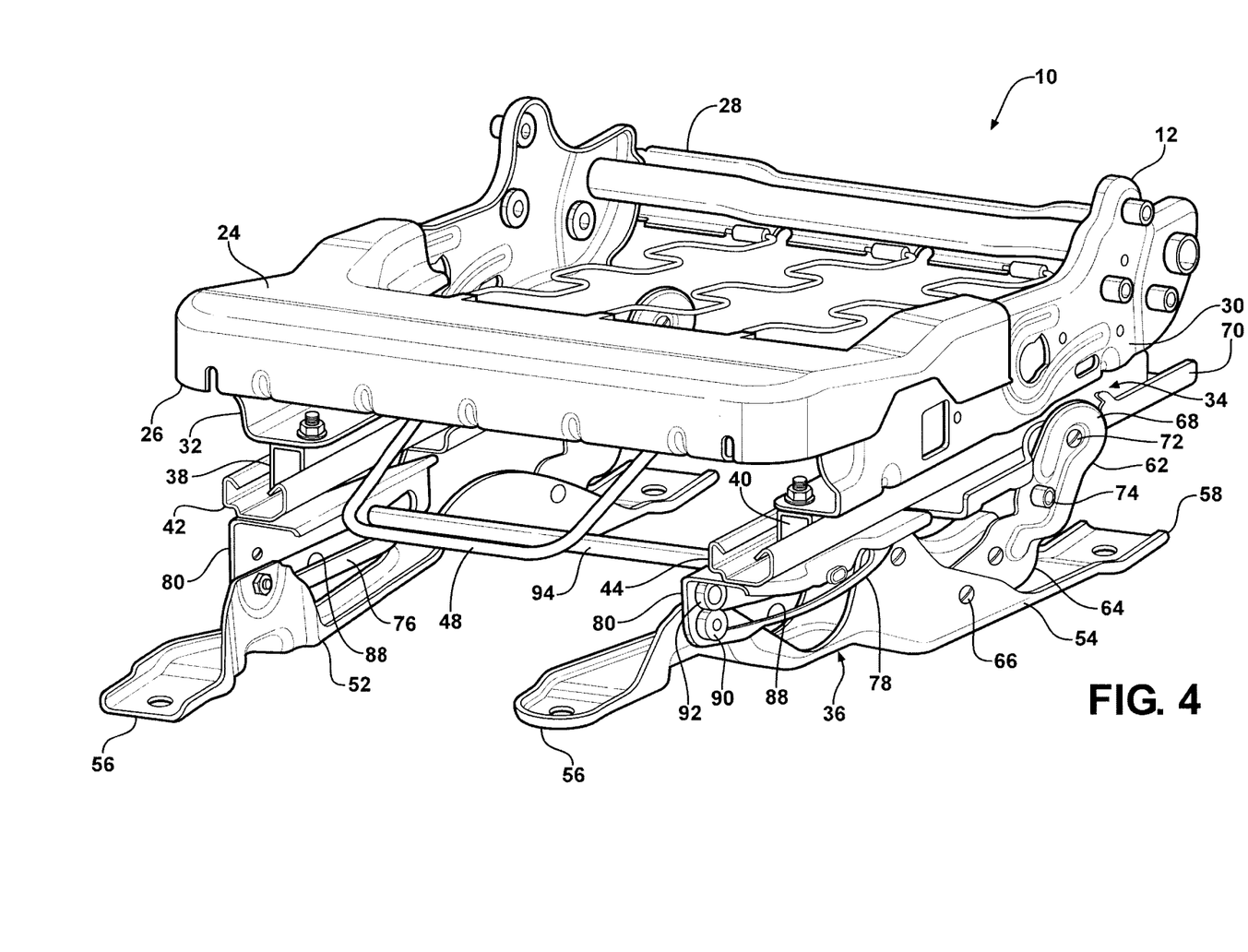
FIG. 4 is a perspective view of a seat cushion frame and tip slide mechanism of the seat assembly of FIG. 1.

Referring to FIG. 4, the seat assembly 10 is partially shown without the seat back 14. The seat cushion 12 includes a seat cushion frame 24 extending between a forward end 26 and a rearward end 28 and defining a longitudinal axis therebetween. The seat cushion frame 24 typically supports a resilient foam pad encased by a trim cover. The riser assembly 18 supports the seat cushion frame 24 above the vehicle floor 16. The seat cushion frame 24 includes a pair of mounting brackets 30, 32 spaced apart on opposite side of the frame 24 and extending between the forward end 26 and rearward end 28 The riser assembly 18 includes a seat track assembly 34 mounted to the mounting brackets 30, 32 of the seat cushion frame 24 and a tip slide mechanism 36 mounted to the seat track assembly 34 and adapted to be mounted to the vehicle floor 16.

Figure 6:
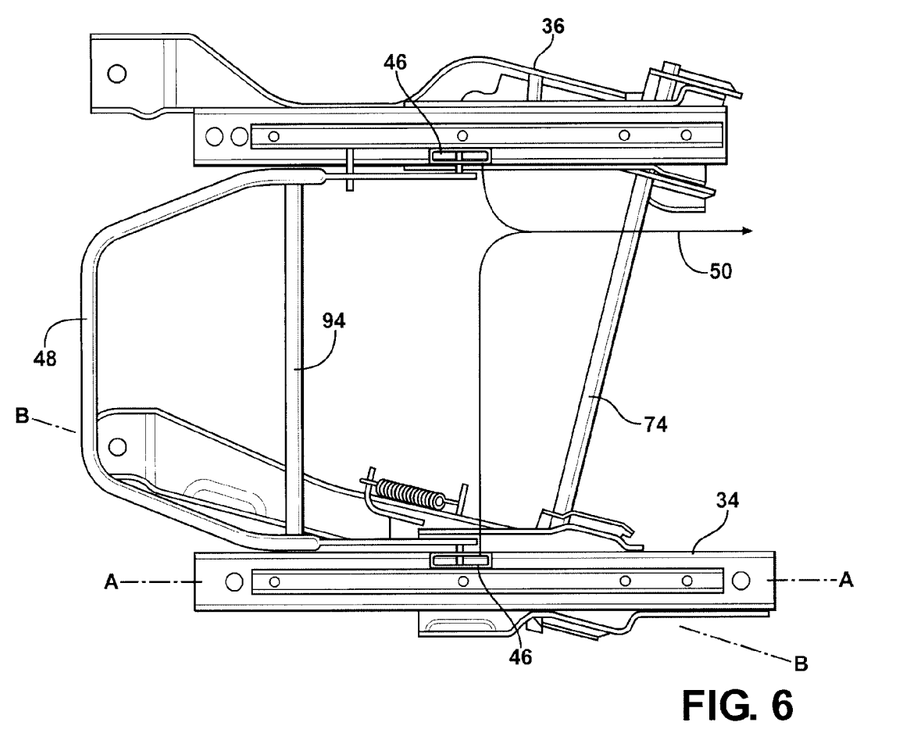
FIG. 6 is a top elevational view of the seat tracks and tip slide mechanism of the seat assembly of FIG. 4.
Figure 7:
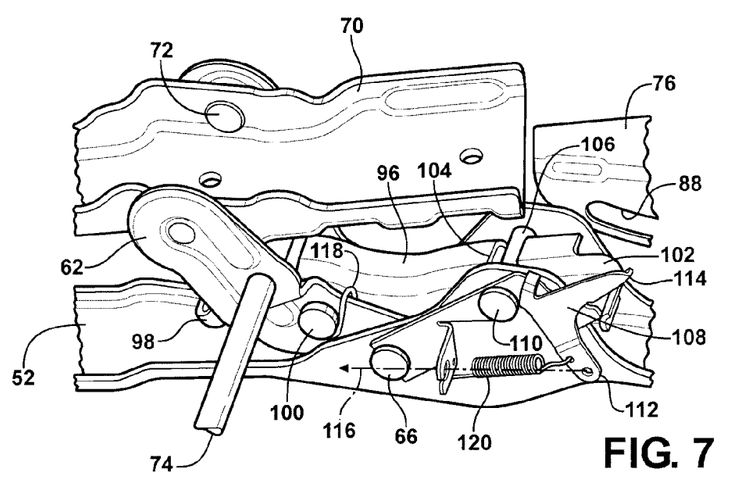
FIG. 7 is a fragmentary perspective view of the tip slide mechanism.

The seat track assembly 34 provides for fore and aft sliding movement of the seat assembly 10 along a first path A relative to the vehicle floor 16. The tip slide mechanism 36 provides for fore and aft sliding and pivotal movement of the seat assembly 10 along a second path B transverse to the first path A and relative to the vehicle floor 16. The seat track assembly 34 includes a pair of upper tracks 38, 40 fixedly secured to the mounting brackets 32, 30 respectively, and a pair of lower tracks 42, 44 slidably coupled to the upper tracks 38, 40. The upper and lower tracks 38, 40, 42, 44 extend longitudinally between the forward and rearward ends 26, 28 of the seat cushion frame 24 and define a linear first path A along the longitudinal axis of the seat cushion 12. The upper and lower tracks 38, 40, 42, 44 are selectively interlocked by a latch mechanism 46, as shown in FIG. 6, for selectively locking and unlocking the upper tracks 38, 40 along the lower tracks 42, 44 in any desired position between a full rearward position, as shown in FIG. 1, and a full forward position, as shown in FIG. 3. A towel bar 48 is connected to the latch mechanism 46 for actuating the latch mechanism 46 between a locked and unlocked condition. Additionally, a first cable release mechanism 50 extends between the seat back 14 and the latch mechanism 46 for selectively actuating the latch mechanism 46 from the locked condition to the unlocked condition in response to pivotal movement of the seat back 14 from the seating or reclined position to the dump position, thus allowing the seat assembly 10 to slide to the full forward position.

Figure 5:
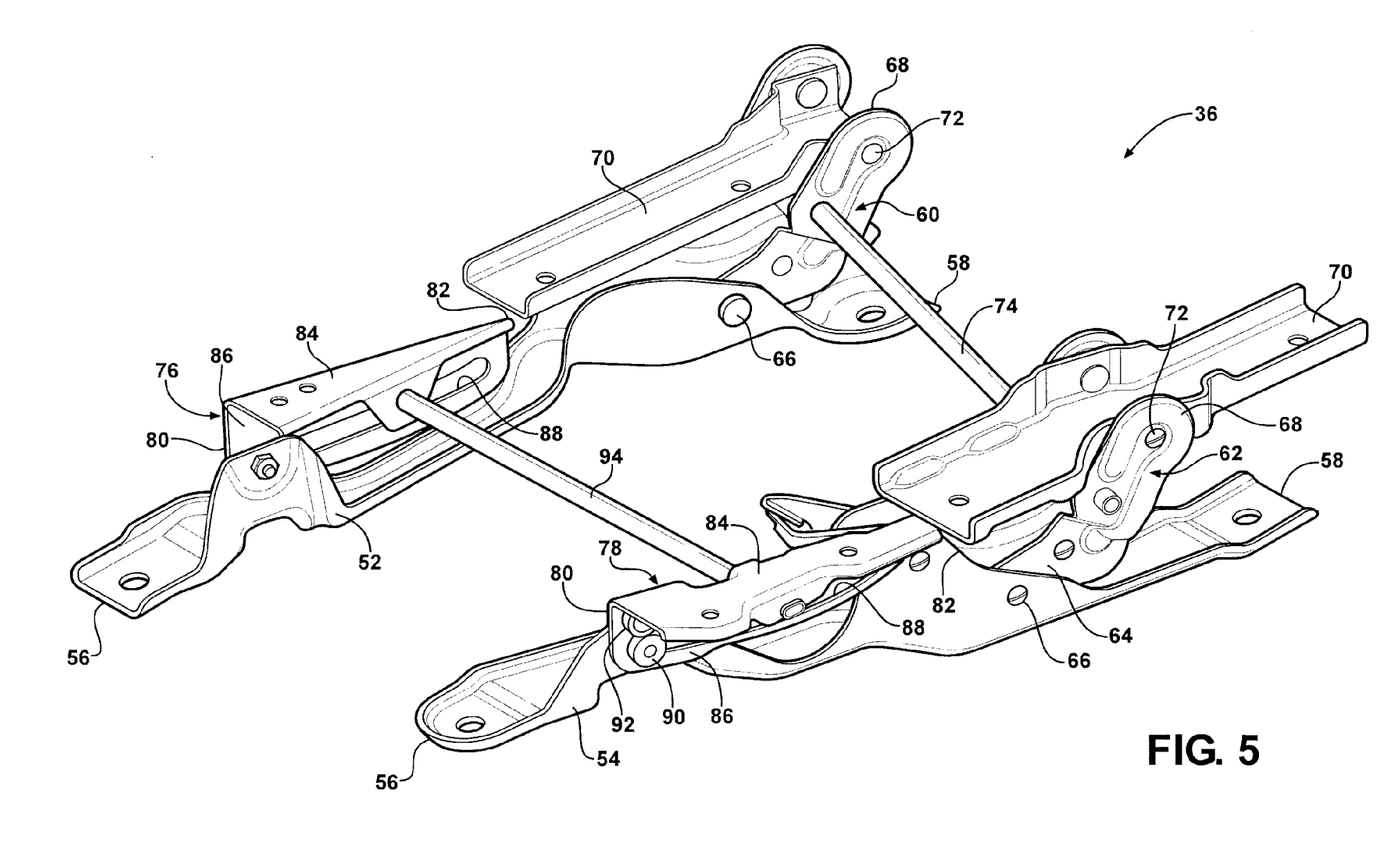
FIG. 5 is a perspective view of the tip slide mechanism of the seat assembly of FIG. 4.

Referring to FIGS. 4 and 5, the tip slide mechanism 36 includes a pair of spaced apart and parallel lower mounting base plates 52, 54 extending longitudinally between a forward end 56 and a rearward end 58 for fixedly mounting the seat assembly 10 to the floor 16 along the second path B. In the preferred embodiment of the invention shown, the second path B travels forward and outward generally from the inboard of the vehicle toward the outboard of the vehicle in order to facilitate the seat assembly 10 to clear the center console and front instrument panel within the vehicle in the easy entry position. More specifically, the tip slide mechanism 36 further includes a pair of rear legs 60, 62 extending between a first end 64 pivotally connected at pivot 66 to the mounting base 52, 54 adjacent the rearward end 58 and an opposite second end 68 pivotally connected to an upper mounting bracket 70 at pivot 72. A first connecting rod 74 extends laterally between and interconnects the rear legs 60, 62 between the first and second ends 64, 68 to provide lateral stability thereto.

The tip slide mechanism 36 also includes a pair of front sliders 76, 78 extending between a first end 80 and an opposite second end 82 and generally parallel with the seat track assembly 34. The sliders 76, 78 are generally L-shaped and include an upper mounting plate 84 and a side plate 86 extending downwardly from the upper mounting plate 84. An arcuate slot 88 is formed in the side plate 86 and extends between the first and second ends 80, 82. The arcuate slot 88 slidably receives a roller 90 rotatably coupled to the lower mounting base 52, 54 for slidably guiding the sliders 76, 78 fore and aft about an arcuate path between the first and second ends 80, 82. A resilient bushing 92 is mounted to the side plate 86 adjacent the first end 80 for engaging the roller 90 to assist in dampening noise and vibration in the tip slide mechanism 36 in the seating position. A second connecting rod 94 extends laterally between and interconnects the front sliders 76, 78 between the first and second ends 80, 82 to provide lateral stability thereto.

Referring to FIGS. 7-10, the tip slide mechanism 36 includes a release latch 96 extending between a first end 98 pivotally connected to the rear leg 62 between the first end 64 and second end 68 at pivot 100 and a second distal end 102. A slot 104 is formed in the second distal end 102 for receiving a striker 106 secured to the lower mounting base 54 to secure the tip slide mechanism 36 and seat assembly 10 in the seating position spaced above the vehicle floor 16. A release lever 108 is pivotally connected to the lower mounting base 54 adjacent the second end 102 of the release latch 96 at pivot 110 for releasing the release latch 96 from the striker 106. The release lever 108 is generally V-shaped and includes a first arm 112 and a second arm 114 for engaging the second end 102 of the release latch 96. A second cable release mechanism 116 extends between the seat back 14 and the first arm 112 for pivoting the release lever 108 and in turn pivoting the release latch 96 to release the slot 104 from engagement with the striker 106 and allow pivotal movement of the rear legs 60, 62. A first spring 118 is coupled between the lower mounting base 54 and the release latch 96 for biasing the release latch 96 into engagement with the striker 106. A second spring 120 is coupled between the lower mounting base 54 and the first arm 112 of the release lever 108 for returning the release lever 108 from engagement with the release latch 96.

Referring again to FIG. 4, the seat track assembly 34 is fixedly mounted to the tip slide mechanism 36. More specifically, the forward ends of the lower tracks 42, 44 are mounted to the upper mounting plate 84 of the sliders 76, 78 and the rearward ends of the lower tracks 42, 44 are mounted to the upper mounting brackets 70.

Figure 8:
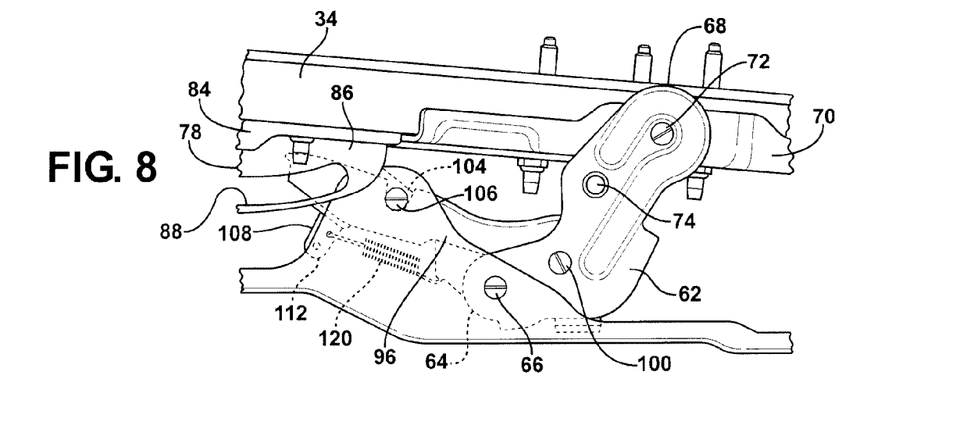
FIG. 8 is a fragmentary side view of the rear legs of the tip slide mechanism in a seating position.
Figure 9:
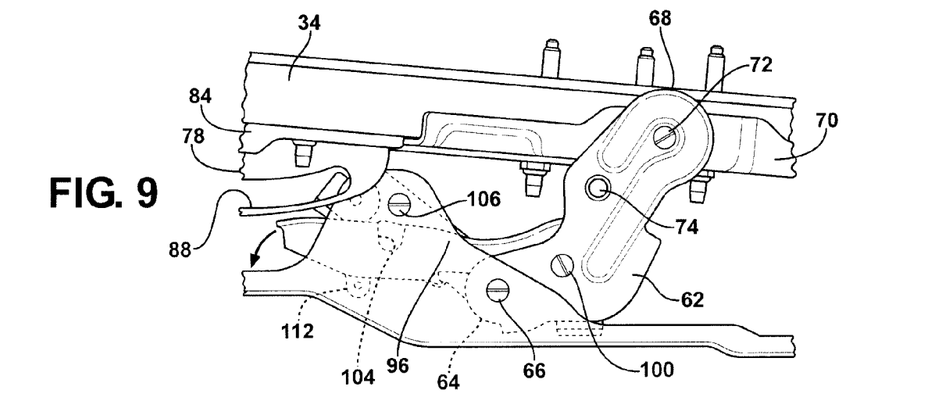
FIG. 9 is a fragmentary side view of the rear legs of the tip slide mechanism in an unlocked position.
Figure 10:
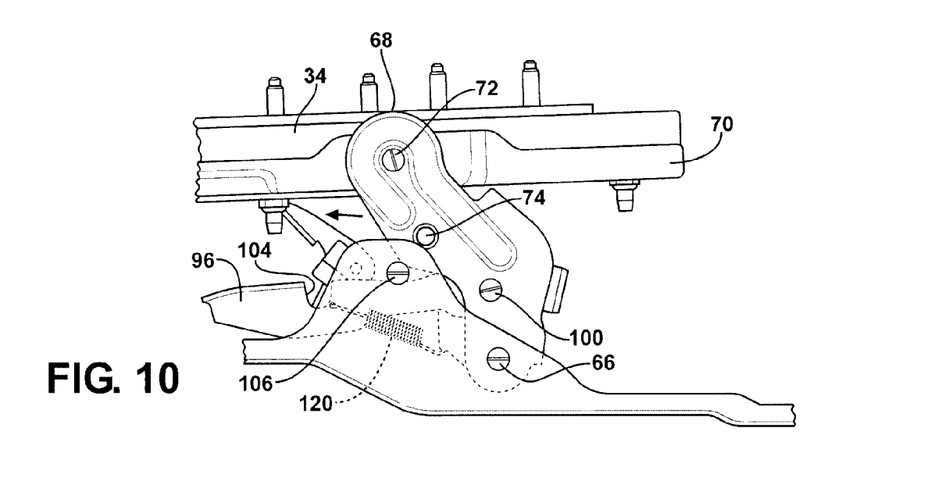
FIG. 10 is a fragmentary side view of the rear legs of the tip slide mechanism in an easy entry position.
Figure 11:
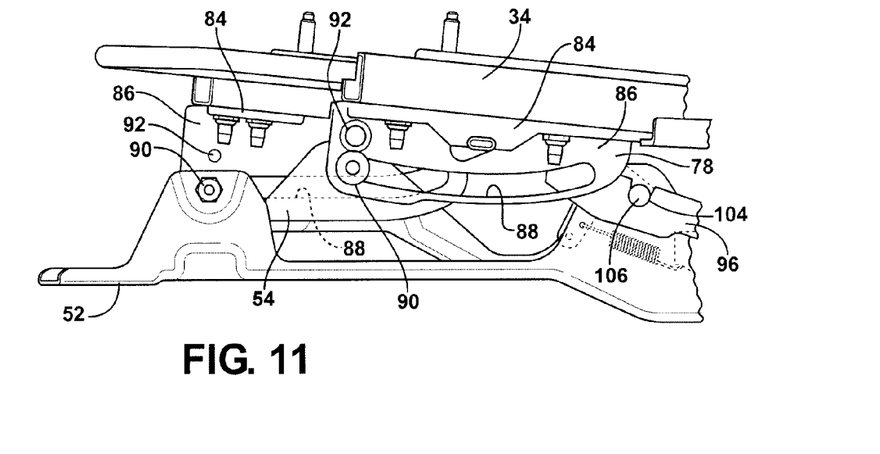
FIG. 11 is a fragmentary side view of the front guide of the tip slide mechanism in the seating position.
Figure 12:
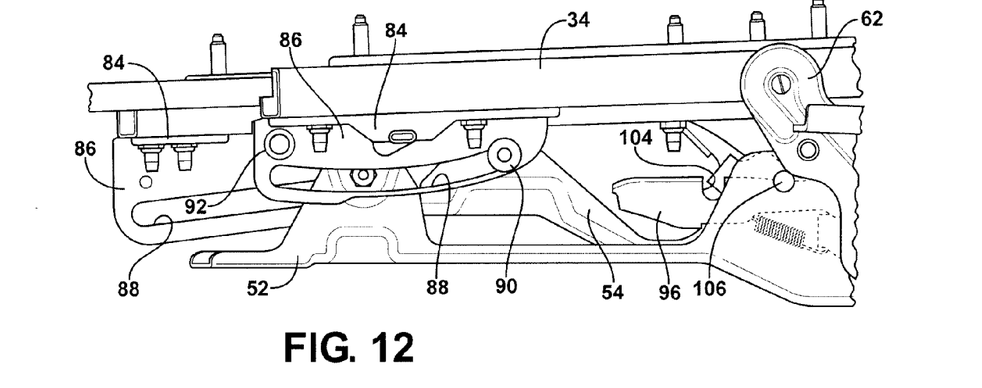
FIG. 12 is a fragmentary side view of the front guide of the tip slide mechanism in the easy entry position.

In operation, with the seat assembly 10 in the seating position as shown in FIG. 1, the seat occupant may selectively and manual adjust the fore and aft position of the seat assembly 10 by actuating the towel bar 48 to unlock the latch mechanism 46 allowing sliding movement of the upper tracks 38, 40 along the lower tracks 42, 44 as is commonly known in the art. When the towel bar 48 is released, latch mechanism 46 of the seat track assembly 34 returns to the locked condition to prevent further sliding of the seat assembly 10. When it is desirable to position the seat assembly 10 in the easy entry position to provide ingress and egress behind the seat assembly 10, such as to a rear seat assembly, the recliner 22 is actuated to allow pivotal movement of the seat back 14 relative to the seat cushion 12. As the seat back 14 is pivoted from the upright position, or a reclined position, to the dump position, as shown in FIG. 2, the first cable release mechanism 50 is actuated to unlock the latch mechanism 46 and allow sliding movement of the upper tracks 38, 40 along the lower tracks 42, 44. The second cable release mechanism 116 is also actuated upon pivotal movement of the seat back 14 to the dump position to unlock the release latch 96. More specifically, as the seat back 14 is pivoted to the dump position, the second cable release mechanism 116 actuates to pivot the release lever 108 in the clockwise direction shown in FIG. 7. It should be appreciated that either or both of the first and second cable release mechanism 50, 116 may alternatively be manually actuated by a lever mechanism independent of the pivoting of the seat back 14 without varying from the scope of the invention. The second arm 114 of the release lever 108 engages the second end 102 of the release latch 96 to pivot the release latch 96 about pivot 100, also in the clockwise direction as viewed in FIG. 7. Referring to FIGS. 8-10, pivoting of the release latch 96 releases the slot 104 from the striker 106 to unlock and allow pivotal movement of the rear legs 60, 62. The seat assembly 10 may now be tipped forward by the forward pivotal movement of the rear legs 60, 62. The forward and outward pivotal movement of the rear legs 60, 62 define a curved second path B which is transverse to the linear first path A defined by the seat track assembly 34. As the rear legs 60, 62 pivot forwardly, the sliders 76, 78 travel forwardly and are guided by the roller 90 sliding along the arcuate slot 88 from the first end 80 to the second end 82 as shown in FIGS. 11 and 12. The shape of the arcuate slot 88 defines a path of travel of the forward end of the seat cushion 12 from a generally horizontal seating position as shown in FIG. 11 to a downwardly tipped position as shown in FIG. 12.

Additionally, as the rear legs 60, 62 pivot and move the seat assembly 10 forwardly, the seat assembly 10 also travels along the second path B. Referring to FIG. 6, it is shown that the tip slide mechanism 36 is positioned at an angle relative to the seat track assembly 34. More specifically, the lower mounting bases 52, 54 are positioned at an angle relative to the longitudinal axis of the seat track assembly 34. The rear legs 60, 62 travel along the longitudinal axis of the lower mounting bases 52, 54, and therefore, the second path B to move the seat assembly 10 outboard while pivoting and tipping forward to the easy entry position. Finally, with the latch mechanism 46 in the unlocked condition, the upper seat tracks 38, 40 may slide along the lower seat tracks 42, 44 to the full forward position. The movement of the seat assembly 10 along both the linear first path A and curved second path B provides clearance of the seat assembly 10 from the center console and front instrument panel and provides maximum forward movement of the seat assembly 10 to provide improved ingress and egress behind the seat assembly 10.

In order to return the seat assembly 10 from the easy entry position, as shown in FIG. 3, to the seat position, as shown in FIG. 1, the seat assembly 10 is moved rearwardly by the upper tracks 38, 40 sliding along the lower tracks 42, 44 and also pivoted rearwardly by the rear legs 60, 62 while be guided by the sliders 76, 78 to return the seat cushion 12 to the seating position spaced above the vehicle floor 16. The seat back 14 may then be pivoted and returned to the upright position which allows the latch mechanism 46 to actuate to the locked condition interlocking the upper tracks 38, 40 and lower tracks 42, 44. The release latch 96 also returns to the locked condition with the striker 106 received in the slot 104 to retain the rear legs 60, 62 in the upright position.

Figure 13:
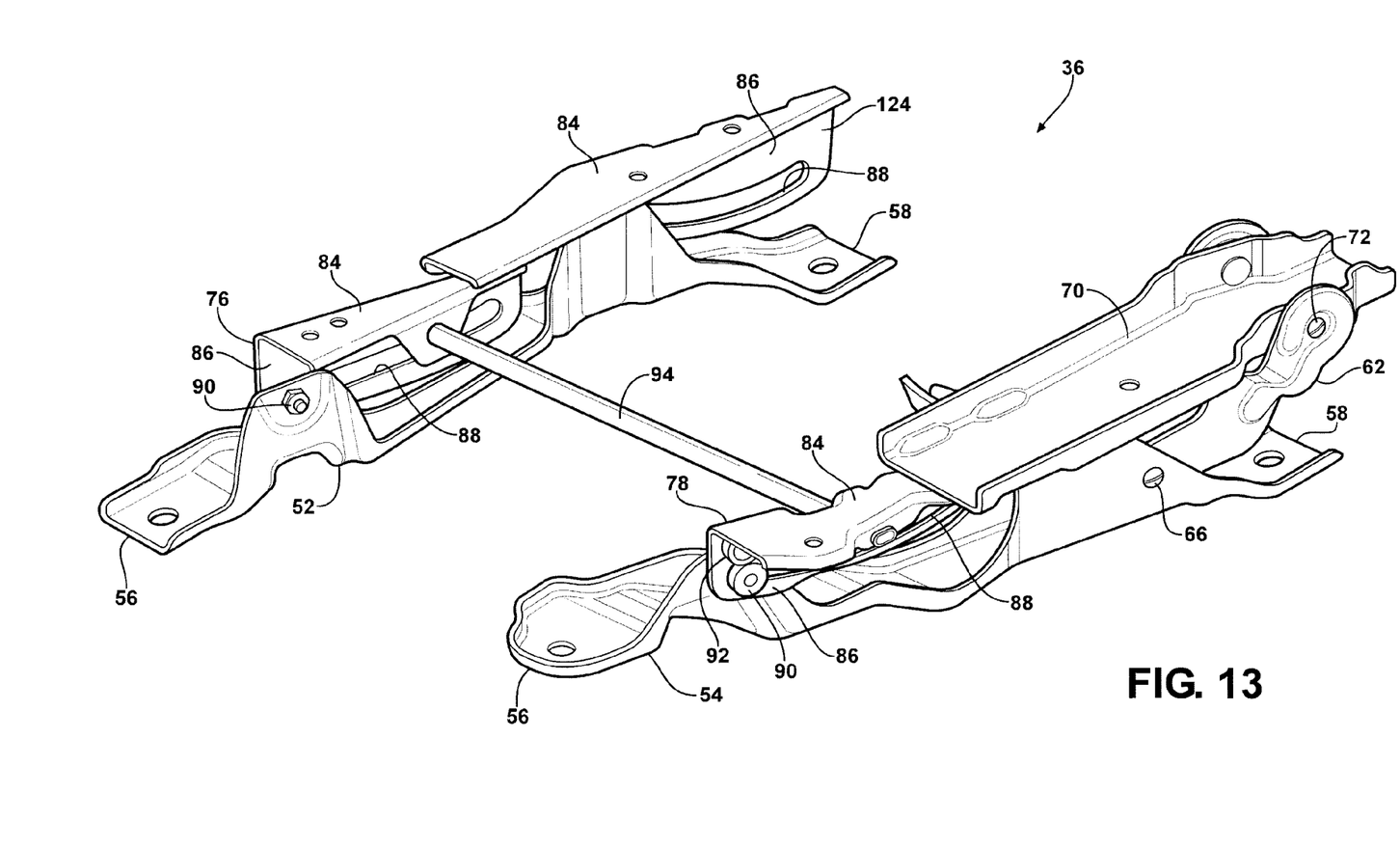
FIG. 13 is a perspective view of the tip slide mechanism according to an alternative embodiment of the invention.

Referring to FIG. 13, an alternative embodiment of the tip slide mechanism 36 is shown. In the embodiment of FIG. 13, one of the rear legs 60 is replaced with a rear slider 124 substantially the same as the front sliders 76, 78. A roller 90 similarly travels along an arcuate slot 88 in the slider 124 to guide the tip slide mechanism 36 between the seating position and the easy entry position during the pivotal movement of the rear leg 60 along the second path B. Therefore, in the alternative embodiment, the substitution of the rear slider 124 reduces the weight and components of the tip slide mechanism 36. Finally, referring to both FIGS. 5 and 13, it should be appreciated that the tip slide mechanism 36 may be mounted directly to the seat cushion frame 24 without the seat track assembly 34. That is, the mounting brackets 30, 32 of the seat cushion frame 24 may be fixedly secured directly to the upper mounting brackets 70 and upper mounting plates 84 of the sliders 76, 78. As such, the tip slide mechanism 36 would provide forward pivoting and tipping of the seat assembly 10 along the second path B from the seating position to the easy entry position, but without the additional forward travel provided by the seat track assembly 34 along the first path A. It should further be appreciated that the tip slide mechanism 36 may be configured to provide movement inboard or outboard within the vehicle and by varying degrees of angle of the second path B. That is, the relative angle between the tip slide mechanism 36 mounted to the vehicle floor 16 and the longitudinal axis of the seat cushion 12 may vary to accommodate a desired path B in either an inboard or outboard direction within the vehicle.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A seat assembly for an automotive vehicle comprising:
a seat cushion extending between a forward end and a rearward end defining a longitudinal axis therebetween and extending laterally between an inboard side and an outboard side generally parallel to said longitudinal axis;
a seat back operatively coupled to said seat cushion for pivotal movement between an upright seating position and a forwardly folded dump position overlying said seat cushion;
a seat track assembly operatively coupled to said seat cushion for providing selective fore and aft sliding adjustment of said seat assembly along a linear first path along said longitudinal axis between a full forward position and a full rearward position; and
a tip slide mechanism operatively coupled to said seat track assembly and adapted for mounting said seat assembly to a floor of the vehicle, said tip slide mechanism providing fore and aft movement of said seat assembly along a second path between a seating position and an easy entry position to provide access behind said seat assembly, said second path positioned at an angle relative to said first path along a horizontal plane defined by said seat cushion and extending between said inboard side and said outboard side of said seat cushion; and wherein said tip slide mechanism includes a pair of spaced apart lower mounting base plates for supporting said seat assembly and adapted for mounting said seat assembly to the vehicle floor, an upper mounting bracket secured to said seat track assembly, and at least one rear leg extending between a first end pivotally coupled to one of said lower mounting base plates and a second end pivotally coupled to said upper mounting bracket for providing said fore and aft movement of said seat assembly along said second path between said seating position and said easy entry position.

2. A seat assembly as set forth in claim 1 wherein said pair of spaced apart lower mounting base plates are parallel and positioned at an angle relative to said longitudinal axis in said horizontal plane defined by said second path.

3. A seat assembly as set forth in claim 2 wherein said tip slide mechanism includes a pair of spaced apart and parallel upper mounting brackets secured to said seat track assembly and a pair of spaced apart and parallel rear legs extending between a first end pivotally coupled to a respective one of said lower mounting base plates and a second end pivotally coupled to said upper mounting brackets wherein the rear legs provide forward and outward pivotal movement of said seat cushion along a curved second path at said angle relative to said longitudinal axis during movement between said seating position and said easy entry position.

4. A seat assembly as set forth in claim 3 wherein said tip slide mechanism includes a slider slidably coupled between each of said pair of lower mounting base plates and said seat track assembly for guiding said seat assembly along said second path between said seating position and said easy entry position.

5. A seat assembly as set forth in claim 4 wherein said slider includes an upper mounting plate secured to said seat track assembly and a side plate having an elongated slot therein for slidably receiving a roller on said lower mounting base plate to guide said tip slide mechanism along said curved second path between said seating and easy entry positions.

6. A seat assembly as set forth in claim 5 wherein said tip slide mechanism includes a release latch operatively coupled between said rear leg and said lower mounting base plate for locking said tip slide mechanism in said seating position.

7. A seat assembly as set forth in claim 6 wherein said release latch includes a first end pivotally connected to said rear leg and a second end biased into engagement with a striker on said lower mounting base plate for locking said tip slide mechanism in said seating position.

8. A seat assembly as set forth in claim 7 further including a release lever pivotally coupled to said lower mounting base plate for selective engagement with said release latch to pivot said release latch from engagement with said striker and providing movement of said tip slide mechanism between said seating and easy entry positions.

9. A seat assembly as set forth in claim 8 wherein said seat track assembly includes an upper track fixedly secured to said seat cushion and a lower track slidably coupled to said upper track and fixedly secured to said sliders and said rear leg for providing selective fore and aft sliding movement of said seat assembly along a linear path defined by said first path.

10. A seat assembly as set forth in claim 9 further including a latch mechanism for actuation between a locked condition interlocking said upper and lower track and an unlocked condition allowing fore and aft sliding movement therebetween.

11. A seat assembly as set forth in claim 10 further including at least one release mechanism for releasing said latch mechanism to said unlocked condition and said release latch from engagement with said striker in response to pivotal movement of said seat back from said upright seating position to said dump position.

12. A seat assembly for an automotive vehicle comprising:
   a seat cushion extending between a forward end and a rearward end defining a longitudinal axis therebetween and extending laterally between an inboard side and an outboard side generally parallel to said longitudinal axis;
   a seat back operatively coupled to said seat cushion for pivotal movement between an upright seating position and a forwardly folded dump position; and
   a tip slide mechanism operatively coupled to said seat cushion and adapted for mounting said seat assembly to a floor of the vehicle, said tip slide mechanism providing fore and aft movement of said seat assembly along a path between a seating position and an easy entry position to provide access behind said seat assembly, said path positioned at an angle relative to said longitudinal axis along a horizontal plane defined by said seat cushion and extending between said inboard side and said outboard side of said seat cushion; and wherein said tip slide mechanism includes a pair of spaced apart lower mounting base plates for supporting said seat assembly and adapted for mounting said seat assembly to the vehicle floor, an upper mounting bracket secured to said seat cushion, and at least one rear leg extending between a first end pivotally coupled to one of said lower mounting base plates and a second end pivotally coupled to said upper mounting bracket for providing said fore and aft movement of said seat assembly along said path between said seating position and said easy entry position.

13. A seat assembly as set forth in claim 12 wherein said pair of spaced apart lower mounting base plates are parallel and positioned at an angle relative to said longitudinal axis in said horizontal plane defined by said path.

14. A seat assembly as set forth in claim 13 wherein said includes a pair of spaced apart and parallel upper mounting brackets secured to said seat cushion and a pair of spaced apart and parallel rear legs extending between a first end pivotally coupled to a respective one of said lower mounting base plates and a second end pivotally coupled to said upper mounting brackets wherein the rear legs provide forward and outward pivotal movement of said seat cushion along a curved path at said angle relative to said longitudinal axis during movement between said seating position and said easy entry position.

15. A seat assembly as set forth in claim 14 wherein said tip slide mechanism includes a slider slidably coupled between each of said pair of lower mounting base plates and said seat cushion for guiding said seat assembly along said path between said seating position and said easy entry position.

16. A seat assembly as set forth in claim 15 wherein said slider includes an upper mounting plate secured to said seat cushion and a side plate having an elongated slot therein for slidably receiving a roller on said lower mounting base plate to guide said tip slide mechanism along a curved path between said seating and easy entry positions.

17. A seat assembly as set forth in claim 16 wherein said tip slide mechanism includes a release latch operatively coupled between said rear leg and said lower mounting base plate for locking said tip slide mechanism in said seating position.

18. A seat assembly as set forth in claim 17 wherein said release latch includes a first end pivotally connected to said rear leg and a second end biased into engagement with a striker on said lower mounting base plate for locking said tip slide mechanism in said seating position.

19. A seat assembly as set forth in claim 18 further including a release lever pivotally coupled to said lower mounting base plate for selective engagement with said release latch to pivot said release latch from engagement with said striker and providing movement of said tip slide mechanism between said seating and easy entry positions.

20. A seat assembly as set forth in claim 19 further including a release mechanism for releasing said release latch from engagement with said striker in response to pivotal movement of said seat back from said upright seating position to said dump position.

* * * * *